United States Patent [19]

Kasmark, Jr. et al.

[11] 4,227,904
[45] Oct. 14, 1980

[54] GAS PHASE PERMEABLE FILTER

[75] Inventors: James W. Kasmark, Jr., Mount Clemens; Myron L. Dooley, New Baltimore; Arthur H. Jones, Marine City, all of Mich.

[73] Assignee: D-Mark, Inc., Mt. Clemens, Mich.

[21] Appl. No.: 940,721

[22] Filed: Sep. 8, 1978

Related U.S. Application Data

[63] Continuation of Ser. No. 709,665, Jul. 29, 1976, abandoned.

[51] Int. Cl.³ .............................................. B01D 50/00
[52] U.S. Cl. ...................................... 55/316; 55/387; 55/487; 55/518; 55/520; 55/524; 55/498
[58] Field of Search .................... 55/316, 387–389, 55/486–488, 514, 498, 518, 519, 524; 210/502, 504; 131/202, 203, 207

[56] References Cited

U.S. PATENT DOCUMENTS

| | | | |
|---|---|---|---|
| 2,159,121 | 5/1939 | Alley | 55/520 |
| 2,166,366 | 7/1939 | Norris | 29/163.5 |
| 2,746,608 | 5/1956 | Briggs | 427/202 |
| 2,764,251 | 9/1956 | Jessop | 55/316 |
| 2,825,424 | 3/1958 | Gross | 55/316 |
| 3,006,346 | 10/1961 | Golding | 55/316 |
| 3,019,127 | 1/1962 | Czerwonka | 55/316 |
| 3,568,416 | 3/1971 | Staunton | 55/514 |
| 3,747,773 | 7/1973 | Jackson | 55/518 |

FOREIGN PATENT DOCUMENTS

| | | | |
|---|---|---|---|
| 2500470 | 10/1975 | Fed. Rep. of Germany | 55/524 |
| 1225751 | 3/1971 | United Kingdom | 155/316 |

*Primary Examiner*—Bernard Nozick
*Attorney, Agent, or Firm*—Burton, Parker & Schramm

[57] ABSTRACT

Described is a gas phase permeable filter and method for making same comprising the steps:

1. Providing a gas phase permeable substrate having opposite surfaces;
2. Applying an adhesive to one or both of the surfaces of the substrate;
3. Applying particulate gas phase odor-removing means to the adhesive coated surface or surfaces of the substrate;
4. Drying the adhesive; and
5. Assembling the substrate in a desired filter configuration wherein the outer surface of the filter is a surface of the substrate free of particulate gas phase odor-removing means and the inner surface of the filter is a surface of the substrate coated with the particulate gas phase odor-removing means adhesively secured thereto.

15 Claims, 9 Drawing Figures

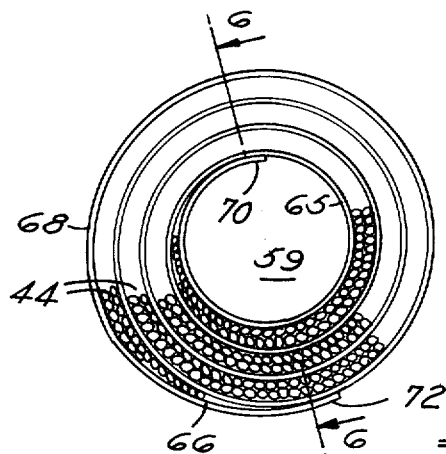
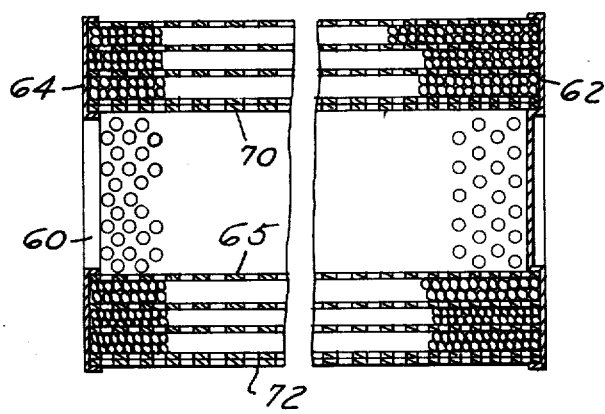
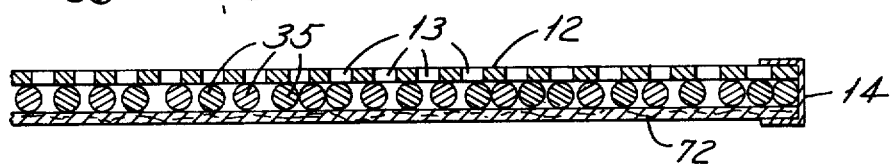
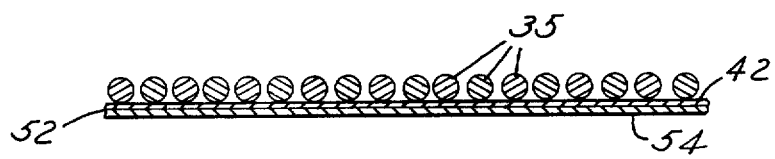
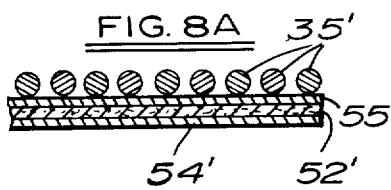
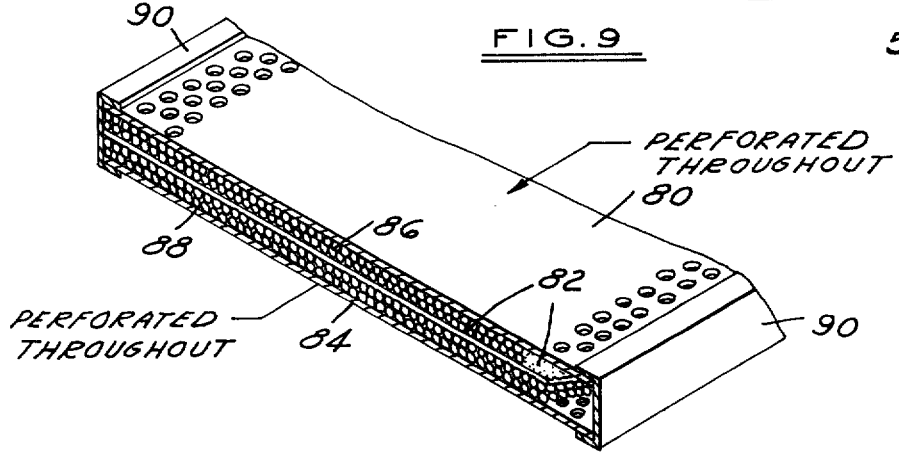

GAS PHASE PERMEABLE FILTER

This is a continuation of application Ser. No. 709,665, filed July 29, 1976, now abandoned.

BACKGROUND

Various gas phase filters have been described in the patent literature. U.S. Pat. Nos. 3,645,072 shows a granular activated carbon filter within a frame of U-shaped channels. The bonded activated carbon body may be reinforced with a wire or other network. U.S. Pat. No. 3,630,007 teaches a disposable activated charcoal filter having a frame open at both sides and subdivided into a plurality of compartments by intersecting partitions. U.S. Pat. No. 3,350,860 teaches granular activated carbon poured into filter containers. U.S. Pat. No. 3,474,600 teaches activated carbon particles bonded together by monoolefin polymers to form pellets and the pellets are then bonded to each other by the polymer to form larger shapes. U.S. Pat. No. 2,544,733 teaches a filter for removing odorous qualities from gases containing a rigid outer frame and an multiplicity of spaced flexible webs carried within said frame and a plurality of layers of granular odor-absorbing material carried between and substantially filling the spaces between said webs. The granules of odor-absorbing material being adhesively united to adjacent surfaces of said webs by means of tapes to prevent relative displacement of said granules with respect to said webs. U.S. Pat. No. 3,577,710 teaches reactant pellets placed in a honeycomb sheet structure and retained therein by foam rubber or plastic cover sheets. U.S. Pat. No. 3,870,495 teaches non woven laid fibers used in air filters. U.S. Pat. No. 3,721,072 teaches a filter for removing odors comprised of granules bonded together in a monolithic extended surface shaped in the form of a wave. U.S. Pat. No. 3,873,287 teaches the construction of assemblies of granular material filled adsorbers or filters for fluids using modular components readily standardized to facilitate assembly of a variety of filter unit sizes and in diverse patterns from stock manufactured parts.

SUMMARY OF THE INVENTION

It is an object of the present invention to manufacture gas phase permeable filters by a quick and convenient method, specifically adhesively securing particulate gas phase odor-removing means to a substrate or grid.

Also described in a gas permeable filter comprising: a gas phase permeable substrate; and particulate gas phase odor-removing means adhesively secured to the gas phase permeable substrate.

The gas phase filter, in particular an air filter, obtained by the process of the present invention is one that is lightweight, has little drop in pressure in the flow of air therethrough, is efficient in the removal of odorous qualities from the gas phase, and substantially reduces or eliminates loss from the filter of the material comprising the particulate odor-removing means. In addition, the improved construction prevents settling of the odor-removing means within the filter both prior to and during use of the filter.

BRIEF DESCRIPTION OF THE DRAWINGS

FIG. 5 shows a filter obtained by use of a single grid or substrate that has been spirally wound or rolled to a desired shaped with particulate gas phase odor-removing means adhered to both faces of the substrate;

FIG. 6 is a cross-sectional view taken on the line 6—6 of FIG. 5;

FIG. 7 shows a filter similar to FIG. 1 except one substrate is a fiber glass batt or the like;

FIG. 8 is another embodiment of the present invention wherein the grid or substrate of the filter is a laminate such as paper and metal;

FIG. 9 is a fragmentary cross-sectional perspective similar to FIG. 1 but shows an intermediate grid between the two outer sheets with particulate gas phase odor-removing means adhesively secured to opposite faces thereof.

DESCRIPTION OF PREFERRED EMBODIMENTS

Figure 1:
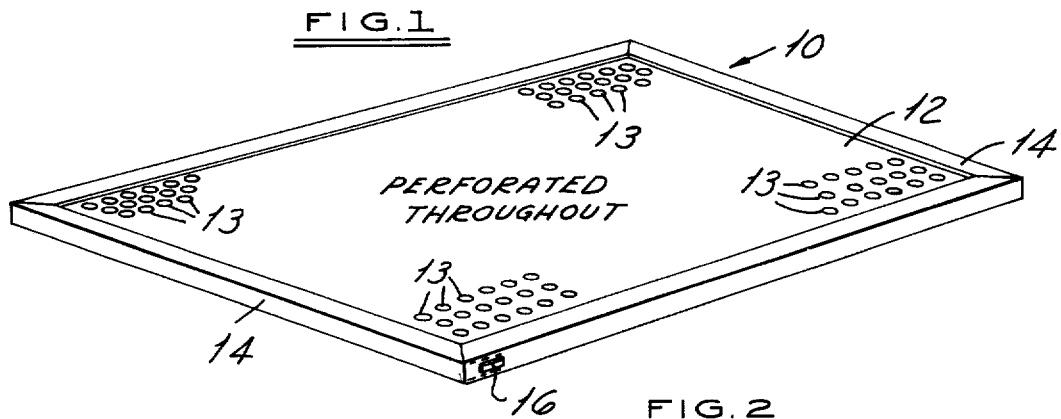
FIG. 1 shows a plan view of the gas phase filter of the present invention in a final assembled condition.

The gas phase permeable filter such as an air filter is manufactured by the following steps:

1. Providing a gas phase permeable substrate having opposite surfaces;
2. Applying an adhesive to one or both surfaces of the substrate;
3. Applying particulate gas phase odor-removing means to the adhesively coated faces of the substrate;
4. Drying the adhesive; and
5. Assembling the substrate in a desired filter configuration wherein the inner surface of the filter is a surface of the substrate coated with the particulate gas phase odor-removing means and the outer surface of the filter is a surface of the substrate uncoated with the particulate means.

There are numerous applications in the home, such as ductless range hoods, room air purifiers, electronic air cleaners, air conditioners, and heating, ventilating systems. Normally the odors to be removed are those generated by human activities and include cooking and smoking, or odors from pets or other animals, or human waste.

In addition, there may be more stringent filtering requirements such as commercial/industrial applications, where fuel exhaust (airports or power plants) and/or manufacturing operations generate specific, and in many cases concentrated odorants which may not only be objectional, but may be also toxic, i.e., sulfur dioxide, formaldehyde, phenols, and the like. In order to remove specific odors, appropriately designed, impregnated, or selected gas phase odor-removing means may be employed, with or without the use of a means for removing smoke, dust, or other particulates.

The gas phase odor-removing means may be any particulate substance, such as flakes, particles, pellets or granules. Generally the particles have a range in size from 12/28 to 4/6, preferably 6/8 mesh measured by either U.S. or Tyler screen series. The filtering means itself, that is the gas phase odor-removing means, may be activated carbon, having a pelletilized, flake, or granulated size and shape, and may be obtained from a supplier such as Union Carbide Corporation, or it may be Purafil (Trademark of H. E. Burroughs and Associates for potassium permanganate impregnated activated alumina), or it may be Sanilan (Trademark of Collo G.M.b.H. of West Germany for a chemisorptive filter medium is pellitized form.) These particulate materials may be impregnated with appropriate counteracting materials to the odor-producing substances present in the gas phase which one wishes to purify. For example, there may be an appropriate impregnant in activated carbon, for example to combat the sulfur dioxide, formaldehyde or phenol substances present in the gas phase that one wishes to purify.

The grid or substrate that is used in the present application can be made of a variety of substances. It may be made of appropriate metallic elements such as aluminum, or tin-plated cold-rolled steel, a laminate of paper or paper and metal such as aluminum foil, or a paper substance upon which has been sprayed or applied a reinforcing or strong-adhering coating such as a metallic backing. All that is required for the substrate is that it have appropriate porosity and be stable in the environment in which the filter is used. The substrate should be capable of allowing the gas phase to be filtered to pass freely therethrough. In the case of sheet-like substrates the sheets may be perforated to have an open area as low as 20 percent and a high of about 65 percent, preferably about 45 percent. This should be accomplished by having a substrate having holes of a diameter less than the size of the particulate media. The substrate shown in a preferred embodiment may range from 0.012"–0.040" in thickness.

The adhesive that may be applied to the substrate prior to the application of the particulate gas phase odor-adsorbing substance to adhere the same to the substrate would be any adhesive which could conveniently and securely bond the filtering particles to the substrate. The adhesive must be a strong adhesive and must be one that does not substantially surround the filtering particles itself because the adhesive may then decrease substantially the effectiveness of the filtering medium such as the activated charcoal. In addition, the adhesive must be stable in the environment of the medium in which the filter is used as well as retain its adhering properties to retain securely the particles thereto. Preferably, the adhesive is one that may be tacified by the application of heat to increase the drying of the adhesive.

The most preferred adhesivve is one sold by 3M and identified as laminating adhesive PB-4236 which is a water dispersion containing 47 percent solids content and is a soft gel primarily polychloroprene-based substance weighing about 9.1 pounds per gallon and having a viscosity of approximately 3,000 cps.

The adhesive must be applied to the substrate in such manner as to avoid unwanted seepage through the holes to the opposite face of the substrate. Preferably, it is roll coated onto the substrate to ensure uniform application thereto of approximately 1 mil thickness. The adhesive must be capable of withstanding the appropriate temperatures of the gas phase application such as being stable up to approximately 300° F. The adhesive is one that should be capable of drying in a relatively short period of time. Additionally, the adhesive should be applied such that it does not fill the holes in the substrate thereby decreasing its porosity.

Turning now to a discussion of the drawings, FIG. 1 shows filter 10 of the present invention having a pair of spaced apart perforated grids 11 and 12 each having holes 13 therethrough retained in a U-shaped channel frame 14. The frame may comprise a single U-shaped channel bent at the four corners and locked at the meeting ends by locking tab 16, conventional in filter frame construction. Between the grids 11 and 12 and holding them in spaced apart relation as shown in FIG. 3 is particulate gas phase odor-removing means 35.

Figure 2:
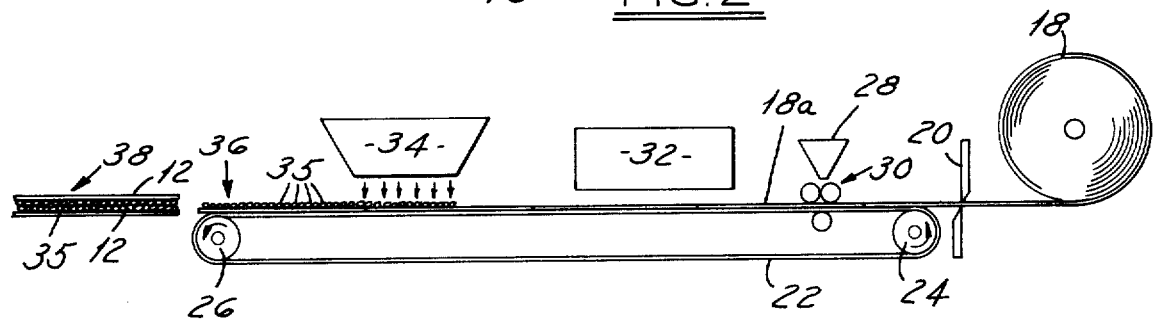
FIG. 2 is a schematic drawing showing the manufacture of the filter of FIG. 1.

The filter 10 is manufactured according to FIG. 2. Roll stock 18 of the perforated substrate is fed to a cutter 20. The substrate cut to size is passed onto a continuous belt 22 maintained between rolls 24 and 26. Adhesive from reservoir 28 is applied by roll coater 30 to the cut grid. A drying oven 32 is stationed above the adhesively treated grid 18a and tacifies the adhesive by subjecting the grid to tacifying temperatures such as 160° F. Thereafter, and before the adhesive hardens, a uniform layer of gas phase removing particles 35 are deposited from tank 34 onto the tacified grid. Because the adhesive dries very quickly the grid with the adhesively secured particles may be handled at the end of the continuous belt station 36. Desirably, following removal of the substrate at station 36, it is inverted and shaken to remove excess, non-adhered particles. The filter 10 of FIG. 1 is obtained by assembling two grids from station 36 by placing one on top of the other with the inner surfaces of the grids facing each other as shown at 38. The two grids are then assembled in the U-shaped frame 14 as best shown in FIG. 3.

It is important that the adhesive be sufficiently tacified by the oven 32 that when the particulate material is deposited thereon at 34, the adhesive will not appreciably capilate into the particulate material and materially reduce its effectiveness. At the same time the adhesive must not have so far set up as to prevent the particulate material from settling into it in bonding contact therewith.

Figure 3:
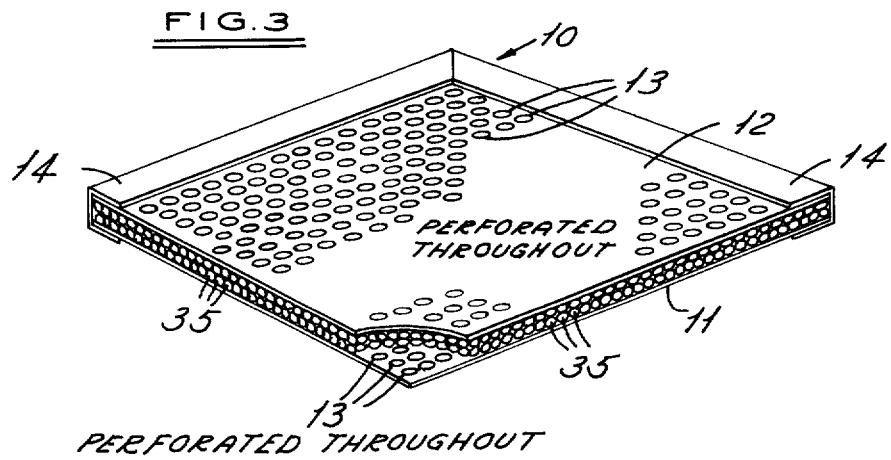
FIG. 3 is a cut away of the filter of FIG. 1.

With the grids assembled as shown in FIG. 3 (and also FIG. 4) the granules or pellets 35 adhered to the grids are disposed in abutting contact. The entire surface areas of the particulate material except for the samll areas in contact with the adhesive on the grids are free to adsorb the odors from the gas phase passed through the filter. The abutting contact of the particles 35 serves to space the substrates 11 and 12 apart.

The U-shaped frame may be manufactured from appropriately shaped metallic or may be lightweight plastic such as polyvinyl chloride or other plastics which are not susceptible to corrosion in the environment in which the filter will be used.

Figure 4:
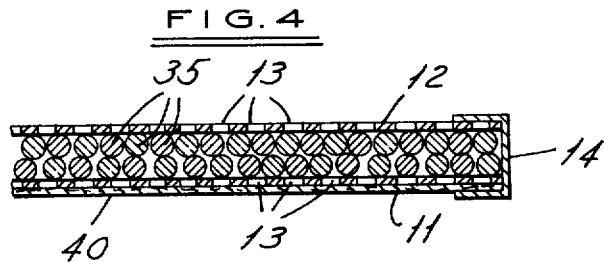
FIG. 4 is a filter of the present invention having a backing of a grease, dust and smoke and other particulate removal mean such as a glass fiber batt.

In a modified form of the FIG. 1 and 3 filter, a batt of loosely matted glass fibers 40 or other suitable nonwoven material may overlie the outer face of grid 11 as shown in FIG. 4. The glass fiber batt will enhance the grease,, duct, smoke and other particulate removal capability of the filter. It is held in place against substrate 11 by adhesive bonding thereto. The adhesive is preferably applied to the substrate and before drying the batt is juxtaposed thereagainst. The channel frame 14 overlies the edges of the batt further retaining same against the substrate.

In FIGS. 5 and 6 a filter of cylindrical shape is shown. It is formed by spirally winding a perforated substrate coated on one but preferably both sides with a uniform layer of particulate odor-adsorbing medium 44. The substrate with the adsorbing particles is spirally wound upon itself to form a hollow central tube 59 into which air or other gas to be filtered is introduced at a central gas entering aperture 60. The gas then passes radially outwardly as indicated by the arrows in FIG. 6. A closure cap 62 overlies one end of the filter and an annular cap 64 overlies the opposite end and defines the central gas entering aperture.

In constructing the filter of FIGS. 5 and 6 a length of perforated substrate 66, such as a flexible laminate of paper having aluminum foil bonded to opposite faces, is coated with an adhesive on both faces and the odor-removing means is then uniformly deposited on the coated faces. End portions of the substrate which when wound into the spiral shape will define the exposed wall 65 of the central tube 59, as well as the outer surface 68 of the filter, are left uncoated so that the aluminum foil surface is exposed. Also, if desired, the aluminum foil may cover only those surfaces of the substrate which will be exposed as aforesaid, the remaining surfaces of the substrate being the paper itself with the particulate odor-adsorbing media bonded thereto. Where the inner and outer ends 70 and 72 of the spiral wrap lap adjacent convolutions, the ends may be adhesively secured or stapled thereto.

Alternatively, if desired, a length of perforated paper substrate may be coated on both faces and the odor-adsorbing media adhered thereto and then the paper wound into spiral form. Over the outside a tube formed of a perforated substrate of paper and aluminum foil having the odor-adsorbing media bonded to the inside of the tube and the foil exposed on the outside may be slipped over the spiral form. A similar but smaller tube with the foil on the inside and media bonded to the outside may be inserted into the center of the spiral, and the hole then closed at opposite ends with caps similar to 62 and 64.

The construction of FIGS. 5 and 6 represent a substantial improvement over the prior art wherein a filter formed by concentric tubes having end caps similar to 62 and 64 is simply filled with loose carbon particulate or similar material because the weight is reduced, air flow improved, the odor-adsorbing media will not settle, and the filter will not bleed carbon fines through the holes.

A further modification of the filter of FIGS. 1 and 3 is shown in FIG. 7 wherein the grid 11 is omitted and in its place a glass fiber or similar batt 72 is substituted. The grid 12, with adhesively bonded odor-adsorbing particles 35, is manufactured as above described. The batt 72 has one surface sprayed or otherwise applied with adhesive and then such surface, following tacification, is juxtaposed against the odor-adsorbing particles 35. Upon curing of the adhesive the batt is retained in place.

The grids or substrates above mentioned may be all metal, or may be a laminated of a cellulosic material such as paper 52 and metal 54 such as aluminum foil as shown in FIG. 8. This substrate may be processed by applying adhesive 42 to the paper surface and particles 35 then deposited thereon. A filter resulting from the substrate adhesively secured particles of FIG. 8 is extremely lightweight and the metal foil acts to strengthen the laminate and protect the paper and as a reflective insulator and provide a decorative finish. The adhesive is roll-coated to the paper side of the substrate and the odor-removing particles 35 applied thereto as above described. The aluminum foil may, if desired, be on both faces of the paper sheet. However, it has been found that the adhesive applied by roll coating will tend to be adsorbed to some extent by the paper and act as a protective layer thereon obviating the use of foil on the inside surface of the filter.

In FIG. 9 a filter is shown which includes three grids 80, 82 and 84. Grids 80 and 84 are similar to grids 11 and 12 of FIGS. 1 and 3. Grid 82 may comprise either a perforated metal or paper or paper/aluminum foil laminate, on opposite faces of which is adhesively fixed uniform layers 86 and 88 of particulate odor-adsorbing media. The grid 82 with opposite faces exhibiting the particulate media is sandwiched between the grids 80 and 84 and the composite enclosed in a frame 90 similar to the FIGS. 1 and 3 structure. This construction substantially doubles the efficiency and life of the filter as compared with the construction of FIGS. 1 and 3.

What is claimed is:

1. A gas phase permeable filter comprising:
    a plurality of self-supporting perforated sheet substrates arranged in confronting spaced apart face-to-face relation having discrete perforations,
    a means for holding said substrates in the aforesaid assembled relation,
    a uniform layer of particulate odor-adsorbing media disposed in the space between said substrates,
    said layer consisting essentially of discrete odor-removing particles ranging in size from approximately 12/28 to 4/6 measured by the Tyler screen series individually adhesively bonded to one of the confronting substrate faces such that the layer is held between the spaced apart substrates against settling or displacement, and
    each odor-removing particle having only a minor portion of its surface in contact with the adhesive and a major portion upstanding from the substrate face and free of adhesive.

2. The filter of claim 1 wherein the particulate odor-adsorbing media is comprised of activated charcoal.

3. The filter of claim 1 wherein the particulate odor adsorbing media is comprised of alumina.

4. The invention defined by claim 1 wherein at least one of the substrates is paper.

5. The invention defined by claim 1 wherein at least one of the substrates is metal.

6. The invention defined by claim 1 wherein each particle of said layer of odor-removing media is bonded to one or the other but not both of the confronting faces of the substrates.

7. The invention defined by claim 1 wherein substantially each particle of said layer of odor-removing media is bonded to both confronting faces of the substrates.

8. The invention defined by claim 1 wherein the substrates comprise a substrate spirally wrapped upon itself through a plurality of convolutions.

9. The invention defined by claim 8 wherein both faces of the substrate internally of the spiral have a layer of said particulate media adhesively bonded thereto.

10. The filter of claim 1 further comprising dust-removing means juxtaposed against an outer face of one of the substrates.

11. The filter of claim 10 wherein the dust-removing means is comprised of a non-woven loose batt.

12. The filter of claim 1 wherein the substrates are comprised of laminae of a cellulosic material and metal.

13. The filter of claim 12 wherein the metal of the laminate is aluminum foil and the cellulosic material is paper.

14. The invention described by claim 1 wherein the particulate media has a size of 6/8 mesh measured by the Tyler screen series.

15. A gas phase permeable filter comprising:

a plurality of self-supporting perforated sheet substrates assembled in confronting spaced apart face-to-face relation having discrete perforations, each of said confronting faces having disposed upon it a uniform layer of odor-adsorbing media consisting essentially of discrete odor-removing particles individually bonded by adhesive to its adjacent confronting face such that the layer is held between the spaced apart substrates against settling and displacement, each odor-removing particle having only a minor portion of its surface in contact with the adhesive and a major portion upstanding from the substrate face and free of adhesive so to form a thickness of odor-removing media between the substrates of approximately two particulate diameters; and a means for holding said substrates in the aforesaid assembled relation.

* * * * *